United States Patent Office 3,449,886
Patented June 17, 1969

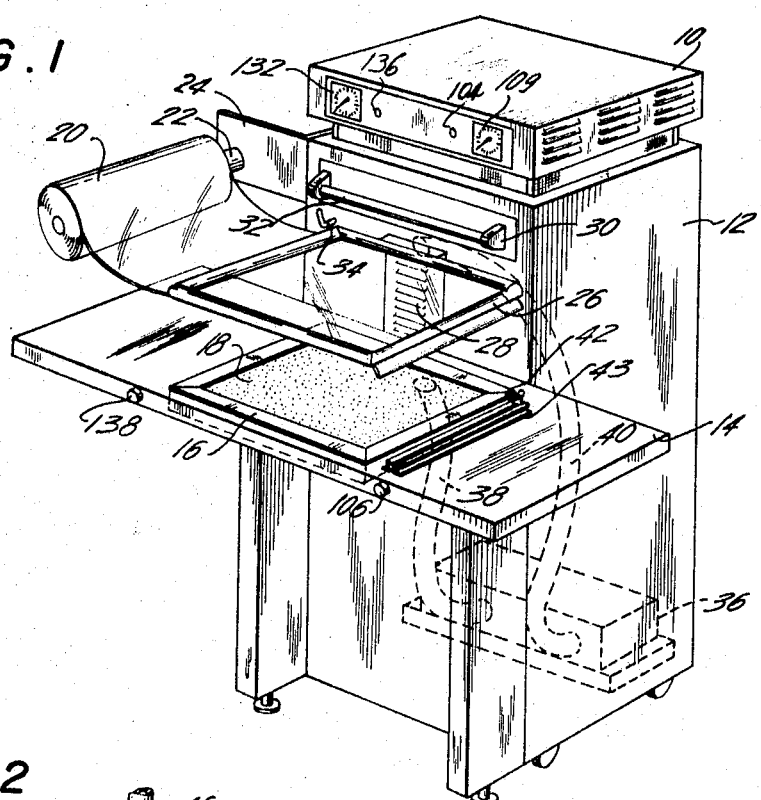
FIG.1
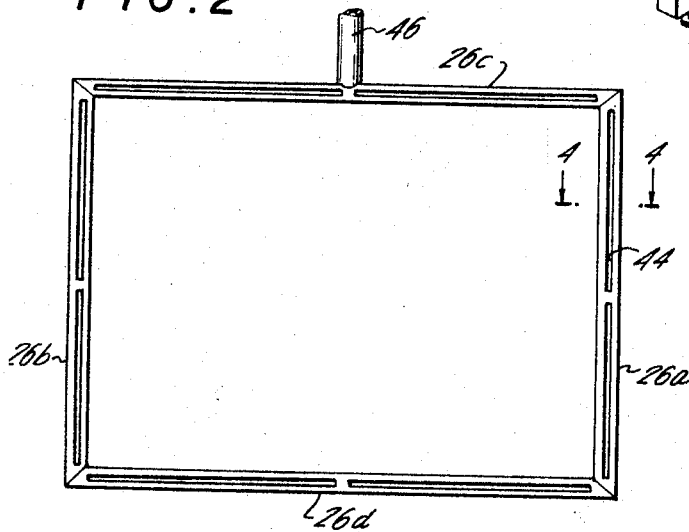
FIG.2
FIG.3
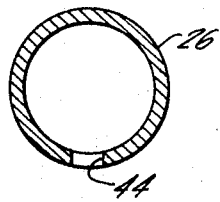
FIG.4
INVENTORS
HAROLD W. CONNELLY
ALFRED C. MONAGHAN
BY
ATTORNEY

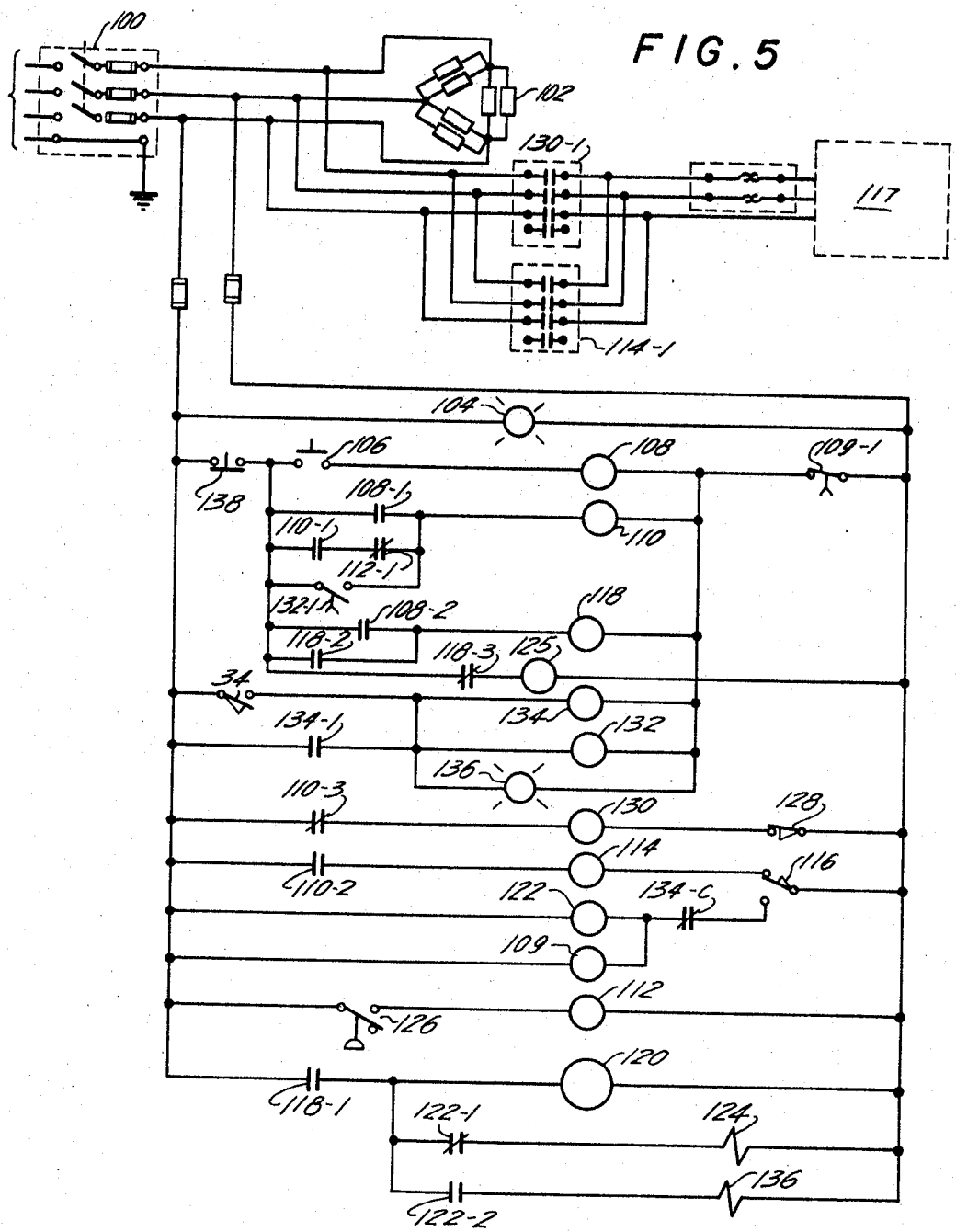

3,449,886
METHOD AND MEANS FOR SKIN PACKAGING ARTICLES ON A POROUS SUBSTRATE
Harold W. Connelly, Rockville Centre, N.Y., and Alfred C. Monaghan, Warren, N.J., assignors to Stanco Packaging Systems Corp., Elizabeth, N.J., a corporation of New Jersey
Filed June 7, 1967, Ser. No. 644,170
Int. Cl. B65b 47/10, 53/02, 49/16
U.S. Cl. 53—22                                                8 Claims

ABSTRACT OF THE DISCLOSURE

A vacuum skin package includes a vacuum box having a perforate upper surface which may be flush with the work table, a heat source above and spaced from the box, a clamp frame to receive and carry film between the heat source and such articles and porous substrate as may be disposed on the box. The clamp frame is a hollow conduit having slots along its lower surface through which a vacuum is drawn to hold the film thereunder. The frame may be transported by a linear actuator.

BACKGROUND OF THE INVENTION

Field of the invention

This invention is related to the packaging of articles on a card with a conforming sheet of plastic film, and particularly to a system for supporting the film over the article and the card.

Description of the prior art

Customarily, articles are mounted on a card with a conforming sheet of plastic film by a technique known as vacuum skin packaging. The article is disposed on a porous card, which card in turn is disposed on a vacuum box. This box is a plenum with a perforated upper surface through which a vacuum can be drawn. A film of a suitable thermoplastic is peripherally clamped in a frame, is softened by heating; and is then lowered onto the article and the card. A vacuum is then drawn through the card, drawing the film to closely conform to the article and to the card. The film is adhered to the card by suitable means, such as adhesive previously applied to the card, or by a pre-treatment of the card and the film.

Conventionally, the frame which clamps the film comprises two open rectangular members which are sandwiched and hinged together along one side, to provide two confronting mating surfaces between which the film is disposed. One of these mating surfaces may be overlaid with an elastomeric material, such as rubber. In operation, the two members are pivoted apart, the film is drawn therebetween, and then the two members are pivoted together to clamp the film, and are locked together by means of a toggle latching mechanism.

The members are conventionally made quite sturdy and rigid to preclude bowing or warping, so as to insure a uniform peripheral clamping pressure therebetween, and as a result are quite heavy.

Since the lower clamp member has a finite height, the upper surface of the vacuum box must extend up from the surface of the work table by this height so as to dispose the upper surface of the card at the height of the clamped film.

Such an arrangement has at least the following limitations:

The operator must manually close and latch the clamp frame onto the film, and the machine cycle must pause to accommodate this close and latch operation.

The weight of the clamp frame requires a heavy duty transport device to raise and lower the frame. Customarily, either an air cylinder or a geared motor is used.

The protrusion of the upper surface of the vacuum box above the surface of the work table precludes the cards with their respective articles from being slid along the surface of the work table, and they must be lifted up onto the vacuum box.

After the article has been sealed on the card, and the clamp frame has been raised, the operator must unlatch the clamp frame.

SUMMARY OF THE INVENTION

In accordance with the invention the foregoing limitations of the prior art are overcome by the provision of a clamp frame comprising a hollow tubular member formed into an annular configuration, and having through its lower surface a series of narrow slots through which a vacuum can be drawn. Such a frame permits the film of thermoplastic material to be disposed at the underside of the frame, and thus the upper surface of the vacuum box may be made level with the work table. Further, the clamp frame may be made of relatively light construction, which may be raised and lowered by relatively fast moving, low-powered transport devices. Yet further, the close and latch, and unlatch and open operations may be replaced by the operation of a valve on the vacuum line.

BRIEF DESCRIPTION OF THE DRAWING

These and other objects, features and advantages of this invention will be apparent from the following specification thereof, taken in conjunction with the accompanying drawing in which:

FIG. 1 is a perspective view of a vacuum skin packaging apparatus embodying this invention;

FIG. 2 is a detail bottom view in plan of the clamp frame of FIG. 1

FIG. 3 is a side view in elevation, rotated 90°, of the clamp frame of FIG. 2;

FIG. 4 is a cross-sectional view, taken along plane 4—4 of FIG. 2; and

FIG. 5 is a schematic diagram of the control circuit of the apparatus of FIG. 1.

THE PREFERRED EMBODIMENT OF THE INVENTION

The vacuum skin packaging apparatus shown in FIG. 1 is a semi-automatic arrangement including a control module 10 mounted on top of a main cabinet 12. Extending forwardly from the cabinet is a work table 14 in which is disposed a vacuum box 16 having an upper perforate surface 18 which is substantially flush with the upper surface of the work table. A supply roll of film 20 is disposed on a support rod 22 which extends forwardly from a support plate 24 which extends laterally from the cabinet. A clamp frame 26 is mounted by a coupling member to a transport device 28 which is disposed at the front of the cabinet, rearwardly of the vacuum box. The transport device is adapted to raise and lower the clamp frame. A heater drawer 30 is disposed within the cabinet and has a handle 32 and suitable guides, not shown, whereby the drawer may be pulled forwardly from the cabinet to overlie the clamp frame. A snap action switch 34 is disposed on the front of the cabinet below the drawer, and is adapted to be actuated by the drawer when it has been pulled fully forward. The drawer carries a plurality of heaters, shown in FIG. 5, adapted to radiate held downwardly, towards the clamp frame. A vacuum blower assembly 36 is disposed within the cabinet and is coupled by a conduit 38 to the vacuum box 16, and a conduit 40 to the clamp frame. A slitting knife 42 is mounted for sliding movement between two Z brackets 43 adjacent the upper surface of the vacuum box on the side opposite the supply roll of film.

The clamp frame 26, which serves as a film carrier means, comprises a tubular conduit of circular cross-section formed into a rectangular configuration large enough to accommodate the article to be packaged, having, as viewed in FIG. 1 and referenced in FIG. 2, a left side tube 26a, a right side tube 26b, a rear tube 26c, and a front tube 26d. Each tube has a mediately interrupted slot 44 therein. The lower surface of the clamp frame is curved and thus vented up to the lowermost slots 44. A coupling tube 46 is joined at its forward end, in vacuum-flow communication, to the rear tube 26c, and at its rearward end to the conduit 40. The tube 46 is mechanically mounted to the moving part of the transport device, which is shown in FIG. 5 as a linear actuator, such as is sold under the trademark "Polynoid" by Skinner Precision Industries, Inc. of New Britain, Conn., U.S.A. It will be understood that the conduit 40 is adequately flexible to permit the movement of the clamp frame. The linear actuator comprises a plurality of windings disposed for sliding movement on a fixed case.

In operation, a disconnect switch 100 is closed, energizing a plurality of heaters 102 which are disposed in the heater drawer, and a power-on pilot light 104. One or more articles to be packaged are disposed on a porous substrate, such as a card, which is disposed on the perforate upper surface 18 of the vacuum box 16. The running end of the film is pulled from the supply roll 20 and is disposed over the article and the card.

A start switch 106, disposed on the front of the work table is momentarily closed, energizing a relay 108, through the normally closed contacts 109-1 of a timing relay 109, and whose normally open contacts 108-1 close, energizing a relay 110 through the closed contacts 109-1. Relay 110 remains energized through its now closed, normally open contacts 110-1 and normally closed contacts 112-1 of a relay 112. Simultaneously, the now closed, normally open contacts 110-2 of relay 110 energize a contactor relay 114 through a snap action limit switch 116 which is in the up position shown when the clamp frame is in its uppermost position. The energized contactor 114 closes its contacts 114-1 to energize the linear actuator 117 to lower the clamp frame onto the film disposed at the vacuum box. Simultaneously, the now closed, normally open contacts 108-2 energize a relay 118, through the closed contacts 109-1, whose now closed, normally open contacts 118-1 energize a vacuum blower motor 120, and whose now closed, normally open contacts 118-2 establish a holding circuit for the relay 118. Also, the closed contacts 118-1 energize, through normally closed contacts 122-1 of a relay 122, the solenoid 124, of a solenoid valve which couples the vacuum blower to the clamp frame conduit 40. Also, relay 118 opens its normally closed contacts 118-3 which deenergize a normally operating blower 125 for cooling the linear actuator. When the clamp frame has clamped onto the film over the articles and the card, the vacuum pressure rapidly rises and at a predetermined vacuum pressure a vacuum switch 126, which is in fluid flow communication with the clamp frame, is closed, energizing the relay 112. Energized relay 112, now opens its normally closed contacts 112-1 to deenergize the relay 110, which now opens its contacts 110-2 to deenergize the relay 114. Deenergized relay 114 opens its contacts 114-1. The deenergized relay 110 also now closes its normally closed contacts 110-3 and through a snap-action limit switch 128, which is in the closed position shown when the clamp frame is in its lower-most position, energize a contactor relay 130, which closes its contacts 130-1 to energize the linear actuator 117 to raise the clamp frame with the film into the film heating position under the heater drawer 30. When the clamp frame is fully raised, it opens the switch 128, which deenergizes the contactor relay 130, and the linear actuator 117.

The operator manually pulls the heater drawer forward over the clamp frame and the film clamped therebelow and when the drawer is fully pulled out it closes the limit switch 34 which, though the normally closed contact 109-1, energizes a timing relay 132, a relay 134, and a "heat" pilot light 136. The relay 134 closes its normally open contacts 134-1 to hold the timing relay 132, the relay 134, and the pilot light 136 energized. When the timing relay 132 times out, it closes its normally open contacts 132-1, which energizes the relay 110. The relay 110 closes its normally open contacts 114-2 to energize the relay 114, as previously described, to lower the clamp frame again. When the clamp frame is at its lower-most position it actuates the switch 116 to its down position, which deenergizes the contactor relay 114 to deenergize the linear actuator 117, and which through the normally closed contacts 134-2 energize the relay 122 and the timing relay 109. The normally closed contacts 122-1 are opened, deenergizing the solenoid 124, cutting off the vacuum to the clamp frame. The normally open contacts 122-2 are closed, coupling the vacuum to the vacuum box by energizing a solenoid 136 of a solenoid operated valve coupling the conduit 38 to the vacuum pump assembly.

The vacuum drawn through the vacuum box causes the softened film to conform to the article and the card. When the timing relay 109 times out, it opens its contacts 109-1, which deenergizes the relay 118, which now opens its normally open contacts 118-2, now opens its normally open contacts 118-1 to deenergize the vacuum blower motor 120 and the solenoids 124 and 136, and now closes its normally closed contacts 118-3 to energize the cooling blower 125. When contact 109-1 opens, it also deenergizes the relay 110 which now closes its normally closed contacts 110-3 to energize the contactor relay 130, to close its contacts 130-1, to energize the linear actuator 117, to raise the clamp frame until it opens the switch 128 to deenergize the contactor relay 130 and the linear actuator 117.

A normally closed stop switch 138 is provided to deenergize the vacuum and the linear actuator systems at any time.

The operator may now remove the package card, article and film from the upper surface of the vacuum box to the right side of the work table. The running end of the film is severed from the package by the knife 42, and a fresh card and article may be placed on the vacuum box.

It will be appreciated that while a single vacuum blower assembly has been shown coupled to both the clamp frame and the vacuum box, each may be supplied by an independent respective blower assembly.

While there has been shown and described a preferred embodiment of the invention, it will be understood that the invention may be embodied otherwise than as herein specfically illustrated or described, and that certain changes in the form and the arrangement of parts and in the specific manner of practicing the invention may be made without departing from the underlying principles of this invention within the scope of the appended claims.

What is claimed is:
1. A skin packaging apparatus comprising:
   a vacuum box having a perforate upper surface adapted to receive thereon a perforate package substrate and an article thereon;
   a source of heat;
   film carrier means including a lower surface adapted to receive thereunder a web of thermoplastic film, a vented recess in said lower surface large enough to receive the article to be packaged and aperture means in said lower surface;
   vacuum producing means coupled to said aperture means for drawing a vacuum therethrough and for drawing and holding the web of film to said lower surface of said film carrier means;
   transport means coupled to said carrier means for alternatively disposing said carrier means and the held thereunder film adjacent said source of heat for the softening of the film, and for disposing said transport means and the softened film adjacent said upper surface of said vacuum box.

2. Apparatus according to claim 1 wherein:
said film carrier means comprises a tubular conduit formed into an annular configuration.

3. Apparatus according to claim 2 wherein:
said lower surface of said tubular conduit slopes outwardly, downwardly to said aperture means.

4. Apparatus according to claim 3 wherein:
said tubular conduit is substantially circular in cross-section.

5. Apparatus according to claim 4 wherein:
said aperture means comprises a longitudinal slot through the lower-most portion of the wall of said tubular conduit.

6. Apparatus according to claim 1 further including:
control means for initially coupling said vacuum producing means to said aperture means of said film carrier means and for subsequently, alternatively, coupling said vacuum producing means to said vacuum box.

7. Apparatus according to claim 6 wherein:
said transport means includes a linear actuator;
said source of heat being disposed above and spaced from said perforate upper surface of said vacuum box; and
said control means also coupled to said linear actuator for actuating said linear actuator to initially elevate said film carrier means to dispose the film adjacent said source of heat and to subsequently lower said film carrier means to dispose the heated film adjacent said vacuum box.

8. A method of skin packaging an article comprising:
disposing a porous substrate on the perforate upper surface of a vacuum box;
disposing an article on the porous substrate;
disposing a web of thermoplastic film over the article and substrate;
adhering the web to the undersurface of an annular clamp frame by means of a vacuum drawn through the undersurface of the clamp frame;
disposing the clamp frame and the film adjacent a source of heat to soften the film;
disposing the clamp frame and the film onto the perforate surface of the vacuum box and onto the article and the substrate;
releasing the vacuum drawn through the undersurface of the clamp frame and drawing a vacuum through the perforate surface of the vacuum box to closely conform the film to the article and the substrate.

References Cited

UNITED STATES PATENTS 2,892,294  6/1959  LaBranche _____ 53—112
3,204,384  9/1965  Dallas _____ 53—22

TRAVIS S. McGEHEE, *Primary Examiner.*

U.S. Cl. X.R.
53—112, 141